United States Patent
Kitamura et al.

(10) Patent No.: US 8,008,874 B2
(45) Date of Patent: Aug. 30, 2011

(54) BRIGHTNESS ADJUSTING DEVICE AND BRIGHTNESS ADJUSTING METHOD

(75) Inventors: Toshihiro Kitamura, Tokyo (JP); Satoshi Kanda, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 157 days.

(21) Appl. No.: 12/312,190

(22) PCT Filed: Nov. 6, 2007

(86) PCT No.: PCT/JP2007/071555
§ 371 (c)(1), (2), (4) Date: Sep. 8, 2009

(87) PCT Pub. No.: WO2008/056665
PCT Pub. Date: May 15, 2008

(65) Prior Publication Data
US 2010/0045211 A1    Feb. 25, 2010

(30) Foreign Application Priority Data
Nov. 6, 2006   (JP) .............................. P2006-300398

(51) Int. Cl.
*G09G 3/36* (2006.01)
(52) U.S. Cl. ....................... 315/309; 345/101
(58) Field of Classification Search .................. 315/291, 315/307–309; 345/100–104, 690
See application file for complete search history.

(56) References Cited

U.S. PATENT DOCUMENTS

| | | | | |
|---|---|---|---|---|
| 7,145,625 | B2* | 12/2006 | Sugino et al. | 349/161 |
| 7,782,315 | B2* | 8/2010 | Hiroki | 345/213 |
| 2003/0231157 | A1* | 12/2003 | Sugino et al. | 345/101 |
| 2004/0201564 | A1 | 10/2004 | Sugino et al. | |
| 2009/0021669 | A1* | 1/2009 | Lee et al. | 349/72 |

FOREIGN PATENT DOCUMENTS

| | | |
|---|---|---|
| JP | 10-253946 | 9/1998 |
| JP | 11-2801 | 1/1999 |
| JP | 2000-89197 | 3/2000 |
| JP | 2000-98347 | 4/2000 |
| JP | 2004-163870 | 6/2004 |
| JP | 2007-219259 | 8/2007 |
| JP | 2007-279481 | 10/2007 |

* cited by examiner

*Primary Examiner* — Don P Le
(74) *Attorney, Agent, or Firm* — McGinn IP Law Group, PLLC (57) ABSTRACT

A brightness adjusting device has: a warm-up time determining unit which calculates a temperature difference between the outside temperature detected by an outside temperature detecting unit and the inside temperature detected by an inside temperature detecting unit and reading and determining a warm-up time corresponding to the calculated temperature difference, as an estimated warm-up time, from a product inside temperature table stored in a product inside temperature table storing unit; a target brightness value determining unit which reads and determines a target brightness value, which corresponds to the estimated warm-up time read and determined by a warm-up time estimating unit, from a target brightness value table stored in a target brightness value table storing unit; and a brightness value setting unit which sets a brightness value of the display device according to the target brightness value read and determined by the target brightness value calculating unit.

6 Claims, 5 Drawing Sheets

BRIGHTNESS ADJUSTING DEVICE AND BRIGHTNESS ADJUSTING METHOD

TECHNICAL FIELD

The present invention relates to a display device and in particular, to a technique of adjusting the brightness of a display device.

The present application claims priority from Japanese Patent Application No. 2006-300398 filed Nov. 6, 2006, the entire contents of which are incorporated herein by reference.

BACKGROUND ART

In recent years, the brightness of a display device manufactured in a factory is adjusted in a brightness adjusting process of a manufacturing process. Particularly when the display device is a liquid crystal display device, the brightness is determined by output light of a backlight device that the liquid crystal display device has, and this output is adjusted.

For this brightness adjustment, a target value is set beforehand for every product of display devices. For example, for a certain product, when the outside air temperature is 25° C., a value of the brightness is set beforehand to 400±10 candela.

A brightness adjusting device used in such a brightness adjusting process measures the brightness of a display device, compares the measured brightness with the above target value, and adjusts the brightness of the display device such that the brightness of the display device becomes the target value. After the brightness is adjusted by such a brightness adjusting device, the display device is shipped as a product in a state where the target value is satisfied beforehand for every product.

In order for such a conventional brightness adjustment to guarantee a brightness value which is a target value, the brightness adjustment was performed after the determined warm-up time passed.

For example, the brightness was measured since 30 minutes as a warm-up time has passed after the power was supplied to the display device, and the brightness of the display device was adjusted.

In addition, the brightness of the display device changes not only with the warm-up time but also with the outside air temperature. For this reason, a technique of detecting a change in the outside air temperature and adjusting the brightness of a display device automatically based on the detected outside air temperature is known (for example, refer to Patent Document 1).

[Patent Document 1] Japanese Patent Unexamined Publication No. 11-2801

DISCLOSURE OF INVENTION

Problem to be Solved by the Invention

However, although the brightness adjustment is performed assuming that the warm-up time of a display device was performed for 30 minutes, for example, the warm-up time depends on a work process of manufacturing or inspection of a display device in a factory practically and is thus different for every product of display devices. For example, the warm-up time of a display device changes with a process performed immediately before a process of brightness adjustment of the display device. This is because the inside temperature of the display device changes due to supply of a current to the display device and the like in the process performed immediately before. In addition, the outside air temperature in a factory may not be constant.

Accordingly, in the case of adjusting the brightness of a display device, there is a problem that the brightness of the display device needs to be adjusted in consideration of not only the warm-up time but also the outside air temperature.

The present invention was made in view of such a situation, and it is an object of the invention to provide a brightness adjusting device and a brightness adjusting method in which a brightness adjustment of the brightness of each display device to a target value is possible even if there is a change in warm-up time or outside air temperature.

Means for Solving the Problem

The invention was made to solve the above-described problems and a brightness adjusting device of a display device in a first embodiment of the invention comprises an outside temperature detecting unit which detects an outside temperature of the display device with an outside temperature sensor device existing outside the display device; an inside temperature detecting unit which detects an inside temperature of the display device with an inside temperature sensor device existing inside the display device; a product inside temperature table storing unit in which a temperature difference between the outside temperature and the inside temperature, and a warm-up time of the display device are associated with each other beforehand to be stored as a product inside temperature table; a target brightness value table storing unit in which the warm-up time and a target brightness value, which is a brightness value becoming a target of the display device at the warm-up time, are associated with each other beforehand to be stored as a target brightness value table; a warm-up time determining unit which calculates a temperature difference between the outside temperature detected by the outside temperature detecting unit and the inside temperature detected by the inside temperature detecting unit, and reads and determines a warm-up time corresponding to the calculated temperature difference, as an estimated warm-up time, from the product inside temperature table stored in the product inside temperature table storing unit; a target brightness value determining unit which reads and determines a target brightness value, which corresponds to the estimated warm-up time read and determined by the warm-up time estimating unit, from the target brightness value table stored in the target brightness value table storing unit; and a brightness value setting unit which sets a brightness value of the display device according to the target brightness value read and determined by the target brightness value calculating unit.

In the brightness adjusting device according to the first embodiment of the invention, the target brightness value table storing unit may store the target brightness value table for every outside temperature, and the target brightness value determining unit may select the target brightness value table, which corresponds to the outside temperature detected by the outside temperature detecting unit, from the target brightness value table storing unit, and may read and determine the estimated warm-up time from the selected target brightness value table.

The brightness adjusting device according to the first embodiment of the invention may further comprise a brightness value detecting unit which detects a brightness value of the display device with a brightness sensor device, and sets the brightness value of the display device based on the detected brightness value and the target brightness value determined by the target brightness value determining unit.

A brightness adjusting device of a display device in a second embodiment of the invention comprises a first inside temperature detecting unit which detects a first inside temperature, which is a temperature of a first portion of the display device, with a first inside temperature sensor device existing at the first portion of the display device; a second inside temperature detecting unit which detects a second inside temperature, which is a temperature of a second portion of the display device, with a second inside temperature sensor device existing at the second portion of the display device; a product inside temperature table storing unit in which a temperature difference between the first inside temperature and the second inside temperature, and a warm-up time of the display device are associated with each other beforehand to be stored as a product inside temperature table; a target brightness value table storing unit in which the warm-up time and a target brightness value, which is a brightness value becoming a target of the display device at the warm-up time, are associated with each other beforehand to be stored as a target brightness value table; a warm-up time determining unit which calculates a temperature difference between the first inside temperature detected by the first inside temperature detecting unit and the second inside temperature detected by the second inside temperature detecting unit, and reads and determines a warm-up time corresponding to the calculated temperature difference, as an estimated warm-up time, from the product inside temperature table stored in the product inside temperature table storing unit; a target brightness value determining unit which reads and determines a target brightness value, which corresponds to the estimated warm-up time read and determined by the warm-up time determining unit, from the target brightness value table stored in the target brightness value table storing unit; and a brightness value setting unit which sets a brightness value of the display device according to the target brightness value read and determined by the target brightness value determining unit.

Moreover, a brightness adjusting method used in a display device of the invention includes a product inside temperature table storing step in which a temperature difference between an outside temperature of the display device and the inside temperature, and a warm-up time of the display device are associated with each other beforehand to be stored as a product inside temperature table in a product inside temperature table storing unit; a target brightness value table storing step in which the warm-up time, and a target brightness value, which is a brightness value becoming a target of the display device at the warm-up time, are associated with each other beforehand to be stored as a target brightness value table in a target brightness value table storing unit; an outside temperature detecting step in which an outside temperature sensor device existing outside the display device detects the outside temperature of the display device; an inside temperature detecting step in which an inside temperature sensor device existing inside the display device detects the inside temperature of the display device; a warm-up time determining step in which a warm-up time determining unit calculates a temperature difference between the outside temperature detected by the outside temperature detecting unit and the inside temperature detected by the inside temperature detecting unit, and reads and determines a warm-up time corresponding to the calculated temperature difference, as an estimated warm-up time, from the product inside temperature table; a target brightness value determining step in which a target brightness value determining unit reads and determines a target brightness value, which corresponds to the estimated warm-up time read and determined, from the target brightness value table; and a brightness value setting step in which a brightness value setting unit sets a brightness value of the display device according to the target brightness value read and determined.

Effect of the Invention

According to the invention, there is an effect that when adjusting the brightness of a display device, the brightness of each display device can be adjusted to a target value even if there is a change of warm-up time or outside air temperature in the brightness to be adjusted as a product of the display device.

REFERENCE SYMBOLS

1: brightness adjusting device
2: display device
3: outside temperature sensor
4: inside temperature sensor
5: brightness sensor
6: brightness value setting storing section
7: control line
8: check display device
101: product inside temperature characteristic function storing section
102: target brightness value characteristic function storing section
103: outside temperature detecting section
104: inside temperature detecting section
105: brightness value detecting section
106: warm-up time determining section
107: target brightness value determining section
108: brightness value setting section

BEST MODE FOR CARRYING OUT THE INVENTION (Basic Configuration)

Figure 1:
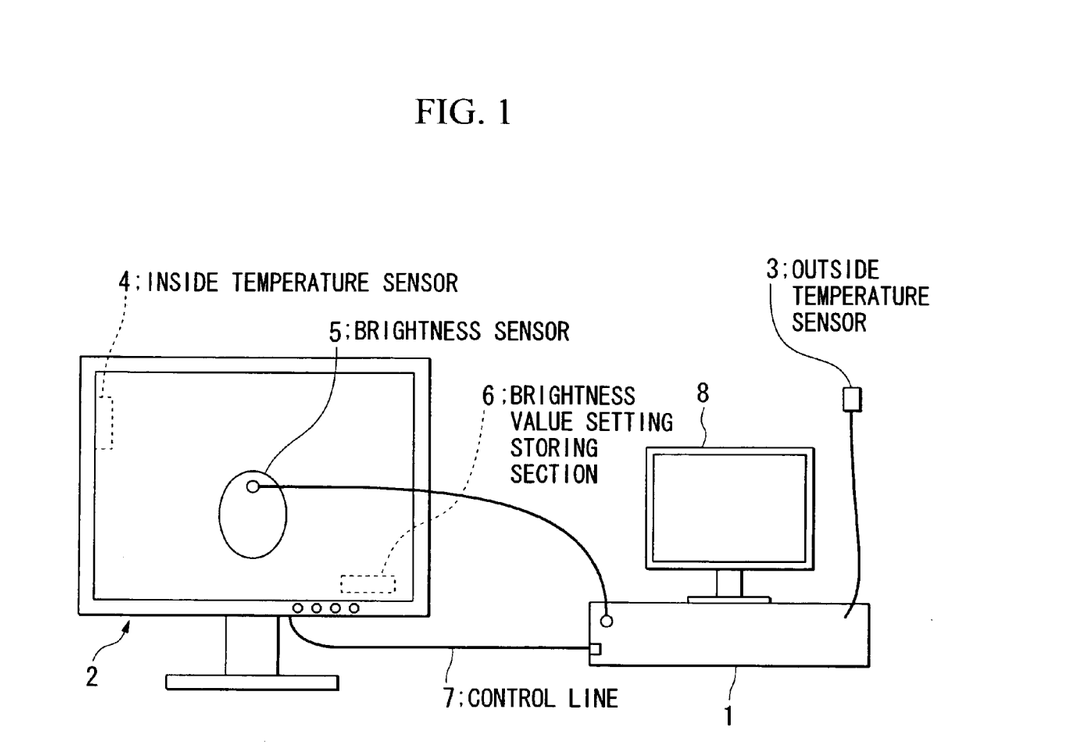
FIG. 1 is a block diagram illustrating the configuration of a brightness adjusting device according to an embodiment of the invention.

Hereinafter, embodiments of the invention will be described with reference to the drawings. FIG. 1 is a schematic block diagram illustrating the configuration of a brightness adjusting device according to an embodiment of the invention.

A display device 2 whose brightness is to be adjusted and a brightness adjusting device 1 which adjusts the brightness of the display device 2 are connected to each other by a control line 7.

An inside temperature sensor 4 which measures the temperature inside the display device 2 (hereinafter, called an inside temperature), a brightness sensor 5 for measuring the brightness of the display device 2 (hereinafter, called a brightness), and an outside temperature sensor 3 which measures the temperature of the ambient air of the display device 2 (hereinafter, called an outside temperature) are connected to the brightness adjusting device 1. The inside temperature sensor 4 is built in the display device 2.

The brightness adjusting device 1 calculates a target brightness value of the display device 2 based on inside temperature, brightness, and outside temperature measured by each sensor and adjusts the brightness of the display device 2 through the control line 7 so as to become the calculated brightness value.

The display device 2 is a liquid crystal type display device, for example. The display device 2 has a brightness value setting storing section 6 for storing a set value of the brightness thereinside, and the display device 2 adjusts a brightness value by adjusting a voltage of a backlight based on the set value stored in the brightness value setting storing section 6.

The brightness adjusting device 1 adjusts the brightness of the display device 2 by changing a set value of the brightness value setting storing section 6 through the control line 7.

In addition, the brightness adjusting device 1 is connected to the inside temperature sensor 4 through the control line 7 and acquires information on the inside temperature.

The brightness sensor 5 measures a brightness value of a display section of the display device 2 by bringing a light receiving section of the brightness sensor 5 close to the display section of the display device 2 from the outside. For example, the brightness sensor 5, which is a measuring device, is attached to a front surface of the display section of the display device 2 and measures the brightness value of the display device 2.

The outside temperature sensor 3 measures the room temperature of a room where the display device 2 is placed for brightness adjustment. The outside temperature sensor 3 is placed to be sufficiently distant from the display device 2 or the brightness adjusting device 1 in order to measure the room temperature regardless of heat generation of the display device 2 or the brightness adjusting device 1.

In addition, an input device (not shown) as a peripheral device, a check display device 8 which is a display device for check, and the like are connected to the brightness adjusting device 1. Here, an input device refers to input devices, such as a keyboard and a mouse. In addition, the check display device 8 refers to a CRT (Cathode Ray Tube), a liquid crystal display device, and the like.

(Principles)

First, the principle in which the brightness adjusting device 1 shown in FIG. 1 adjusts the brightness of the display device 2 will be described using FIGS. 2 and 3.

Figure 2:
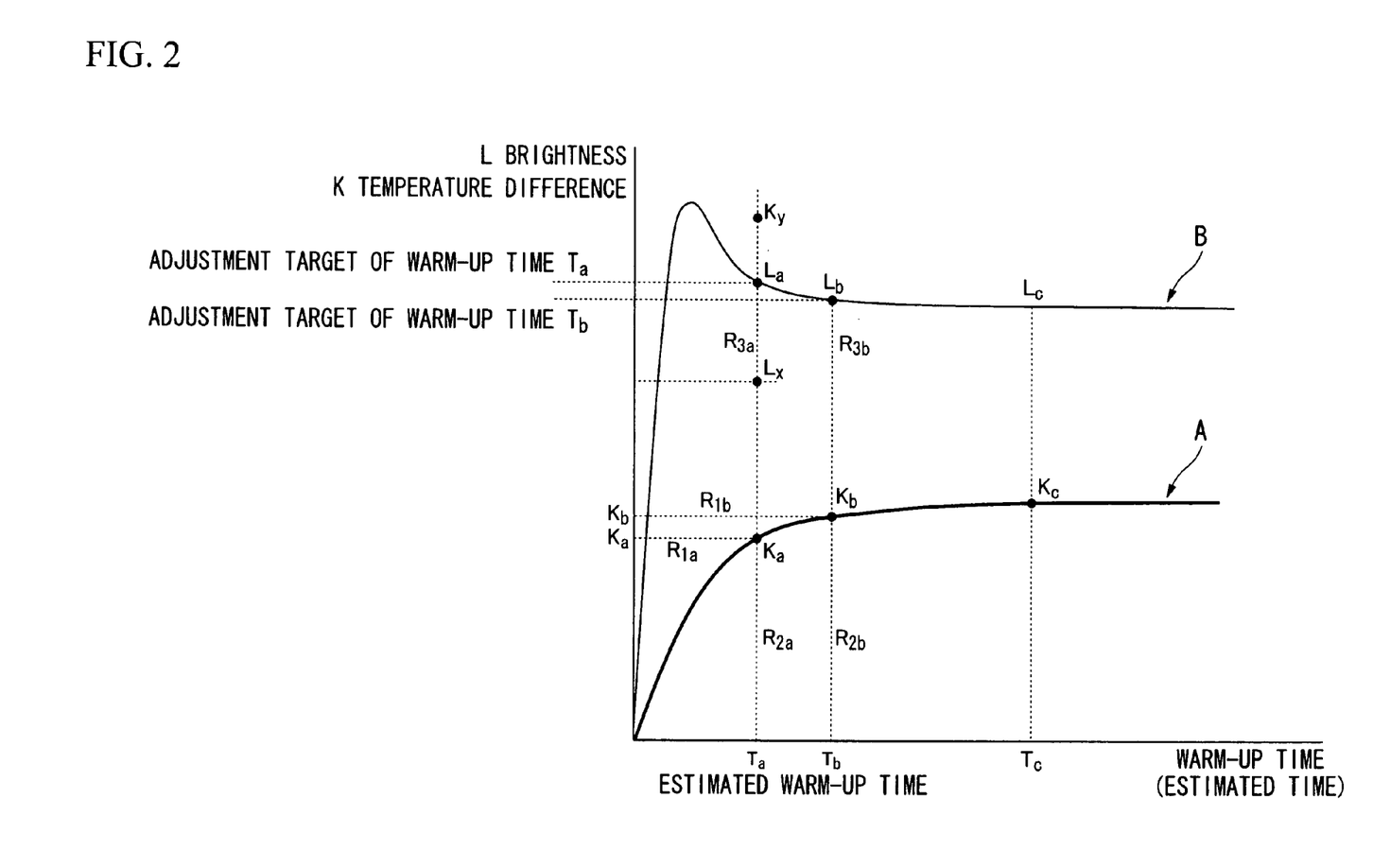
FIG. 2 is a first explanatory view illustrating the principle of a brightness adjustment of the brightness adjusting device shown in FIG. 1.

FIG. 2 shows a product temperature characteristic A and a target brightness value characteristic B with respect to a warm-up time as a graph.

The product temperature characteristic function A is a temperature difference, which is obtained by subtracting the outside temperature from the inside temperature, in time passage of the warm-up time and has a characteristic in which the temperature difference increases with the passage of warm-up time as shown as a curve A in FIG. 2.

The product temperature characteristic function A is based on the elapsed time after the power is supplied to the display device 2. Here, since the inside temperature of the display device 2 is equal to the outside temperature before the power is supplied, the temperature difference of the product temperature characteristic function A is 0 at the time of supply of power.

Moreover, in the product temperature characteristic function A, a change in the temperature difference decreases after a predetermined time has passed since the heat generation amount of the display device 2 becomes equal to the heat radiation amount from the display device 2. For example, a value of the temperature difference of the product temperature characteristic function A is almost constant as a temperature difference Kc before or after a warm-up time Tc when a sufficient time has passed. For example, assuming that such a warm-up time Tc is 30 minutes of the known warm-up time and the warm-up time Tc (=30 minutes) determined beforehand has passed, the brightness adjustment of the display device 2 was performed.

As can be seen from FIG. 2, the temperature difference increases monotonously with the warm-up time in the product temperature characteristic function A. Therefore, it becomes possible to estimate the warm-up time from the temperature difference using the product temperature characteristic function A.

For example, from FIG. 2, when the temperature difference is Ka, the warm-up time can be estimated as Ta from the product temperature characteristic function A. Moreover, from FIG. 2, when the temperature difference is Kb, for example, the warm-up time can be estimated as Tb from the product temperature characteristic function A.

Thus, the warm-up time estimated from the temperature difference using the product temperature characteristic function A is an estimated warm-up time.

The product temperature characteristic function A is a function which can be calculated beforehand by performing experiments for every product or simulation.

Here, since the product temperature characteristic function A depends on the heat generation amount of the display device 2 and the heat radiation amount from the display device 2, the characteristic is uniform for products having the same structure. Therefore, it is preferable that there be one product temperature characteristic function A for every product.

In addition, since the product temperature characteristic function A hardly depend on the outside air temperature, it is preferable that there be one product temperature characteristic function A for every product.

In addition, the target brightness value characteristic B is a function in which the warm-up time and a target brightness value are made to correspond to each other, and is a curve in which a brightness value increases with the passage of warm-up time and then a target brightness value becomes almost constant as the temperature difference of the product temperature characteristic function A becomes constant after the warm-up time Tc as shown as a curve B in FIG. 2.

The target brightness value characteristic B is uniform for every product. In addition, the target brightness value characteristic B is a function which can be calculated beforehand by performing experiments for every product or simulation.

As shown in FIG. 2, the target brightness value characteristic B shows that, for example, the brightness of the display device 2 in case where the brightness value is La at warm-up time Ta becomes a brightness value Lb at warm-up time Tb and subsequently becomes a brightness value Lc at warm-up time Tc according to the target brightness value characteristic B.

Accordingly, when the brightness value of the display device 2 is a brightness value Lx, which is lower than the brightness value La that is a value of the target brightness value characteristic B, at the warm-up time Ta, it is preferable to adjust the brightness value of the display device 2 to become the brightness value La.

Furthermore, on the contrary, when the brightness value of the display device 2 is a brightness value Ly, which is higher than the brightness value La that is a value of the target brightness value characteristic B, at the warm-up time Ta, it is preferable to adjust the brightness value of the display device 2 to become the brightness value La.

Thus, by adjusting the brightness value of the display device 2 at the warm-up time Ta to the brightness value La that is a value of the target brightness value characteristic B at the warm-up time Ta, it becomes possible to secure that the brightness value at the warm-up time Tc after the warm-up time has passed is the brightness value Lc by the target brightness value characteristic B.

Although the target brightness value characteristic B was described only for the case where the outside air temperature was 25° C. in FIG. 2, an explanation will be made next for a case where the outside air temperature is 10° C. and 35° C. using FIG. 3.

Figure 3:
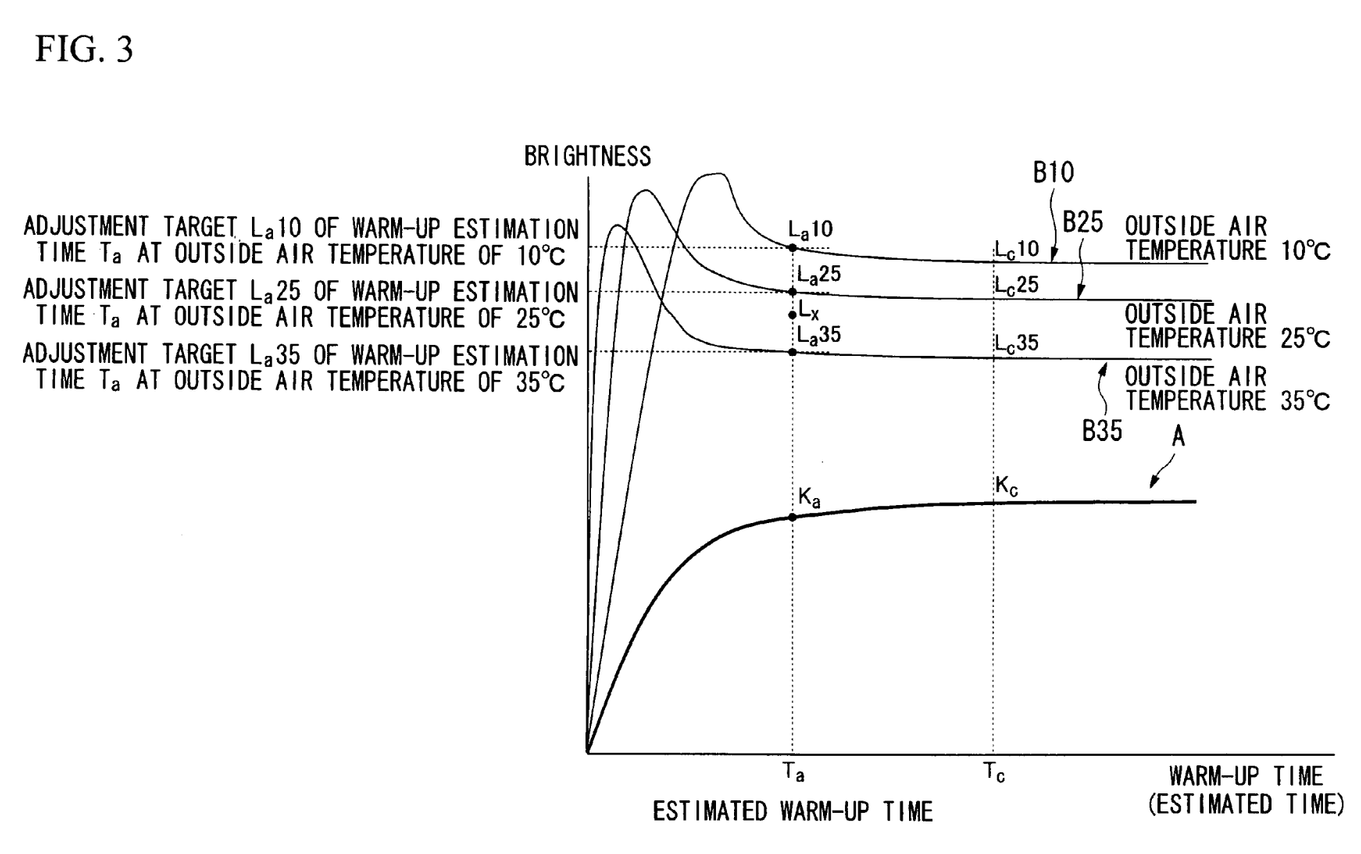
FIG. 3 is a second explanatory view illustrating the principle of the brightness adjustment of the brightness adjusting device shown in FIG. 1.

In FIG. 3, the target brightness value characteristic B in cases where the outside air temperature is 10° C., 25° C., and 35° C. is shown as a target brightness value characteristic B10, a target brightness value characteristic B25, and a target brightness value characteristic B35.

By selecting the target brightness value characteristic B corresponding to the outside air temperature, a target brightness value for each outside air temperature can be selected by determining a target brightness value using the selected target brightness value characteristic B. By adjusting the brightness of the display device 2 to the determined target brightness value, an adjustment as a product of the display device 2 can be made.

First Embodiment

Figure 4:
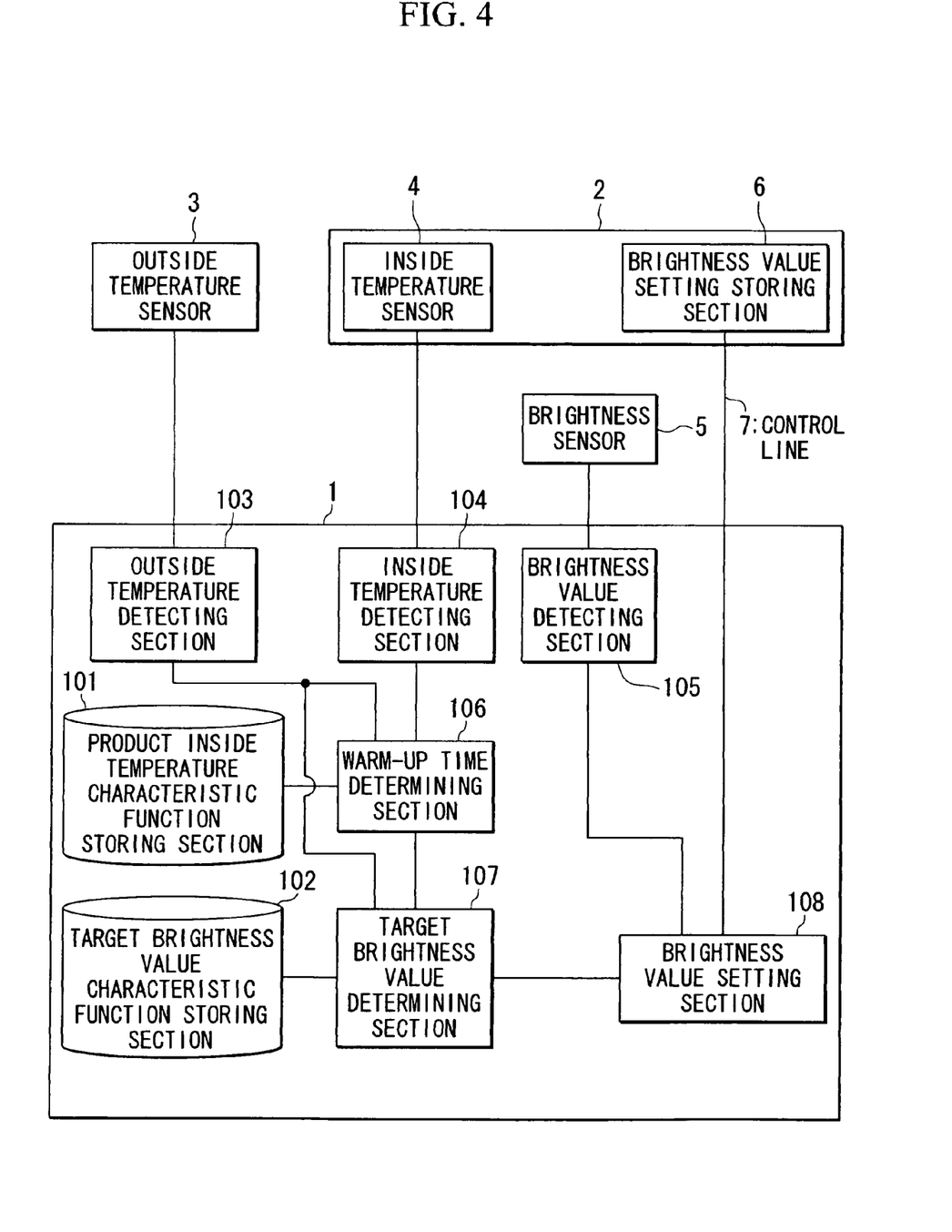
FIG. 4 is a block diagram illustrating the detailed configuration of the brightness adjusting device shown in FIG. 1.

Next, the detailed configuration of the brightness adjusting device 1 will be described using FIG. 4. In addition, a section corresponding to each section shown in FIG. 1 in this drawing is denoted by the same reference numeral, and an explanation thereof will be omitted.

An outside temperature detecting section 103 detects the outside temperature of the display device 2 with the outside temperature sensor 3 existing outside the display device 2. An inside temperature detecting section 104 detects the inside temperature of the display device 2 with the inside temperature sensor 4 existing inside the display device 2. A brightness value detecting section 105 detects a brightness value of the display device 2 with the brightness sensor 5.

In a product inside temperature characteristic function storing section 101 (product inside temperature table storing section 101), a temperature difference between the outside temperature and the inside temperature and a warm-up time are associated with each other beforehand and are stored as a product inside temperature characteristic function for every product of display devices. For example, the product inside temperature characteristic function shown in FIG. 2 or FIG. 3 is stored beforehand as a product inside temperature table in the product inside temperature characteristic function storing section 101.

In a target brightness value characteristic function storing section 102 (target brightness value table storing section 102), a warm-up time and a target brightness value, which is a brightness value becoming a target as a product of the display device 2 at the warm-up time, are associated with each other beforehand and are stored as a target brightness value characteristic function for every product of display devices. For example, the target brightness value characteristic function shown in FIG. 2 or FIG. 3 is stored beforehand as a target brightness value table in the target brightness value characteristic function storing section 102.

In addition, the target brightness value characteristic function is stored for every outside temperature in the target brightness value characteristic function storing section 102. For example, in the target brightness value characteristic function storing section 102, target brightness value characteristic functions are stored for every outside temperature like the target brightness value characteristic functions B10, B25, and B35 shown in FIG. 3.

A warm-up time determining section 106 calculates a temperature difference between the outside temperature detected by the outside temperature detecting section 103 and the inside temperature detected by the inside temperature detecting section 104, reads a warm-up time corresponding to the calculated temperature difference from the product inside temperature characteristic function stored in the product inside temperature characteristic function storing section 101, and determines it as an estimated warm-up time.

A target brightness value determining section 107 reads and determines a target brightness value corresponding to the estimated warm-up time, which was determined by the warm-up time determining section 106, from the target brightness value characteristic function stored in the target brightness value characteristic function storing section 102.

In addition, the target brightness value determining section 107 selects a target brightness value characteristic function corresponding to the outside temperature, which was detected by the outside temperature detecting section 103, from the target brightness value characteristic function storing section 102 and reads and determines an estimated warm-up time from the selected target brightness value characteristic function.

A brightness value setting section 108 adjusts (controls or sets) the display device 2 according to the target brightness value of the brightness value of the display device 2 read and determined by the target brightness value determining section 107. For example, the brightness value setting section 108 sets a brightness value in the brightness value setting storing section 6 of the display device 2 according to the target brightness value read and determined by the target brightness value determining section 107.

In addition, the brightness value setting section 108 sets a brightness value of the display device 2 based on the brightness value of the display device 2 detected by the brightness value detecting section 105 and the target brightness value determined by the target brightness value determining section 107.

For example, the brightness value setting section 108 calculates a difference between the brightness value of the display device 2 detected by the brightness value detecting section 105 and the target brightness value determined by the target brightness value determining section 107 and sets the brightness value of the display device 2 based on the difference (brightness difference) of the calculated brightness value such that the brightness difference becomes 0.

For example, the brightness value setting section 108 compares the calculated brightness difference with a value of an allowable error of the brightness of a product, which is a fixed value set beforehand, and ends the adjustment if the calculated brightness difference is equal to or smaller than the allowable error of the brightness of the product.

On the other hand, when the calculated brightness difference is not equal to or smaller than the allowable error of the brightness of the product, the brightness value setting section 108 sets the brightness value in the brightness value setting storing section 6 of the display device 2 and repeats the adjustment of brightness. In addition, the brightness value setting section 108 repeats the adjustment of brightness of the display device 2 after passage of a stand-by time, which is a fixed time set beforehand in which setting to the brightness value setting storing section 6 is reflected, passes before repeating the adjustment of brightness.

Figure 5:
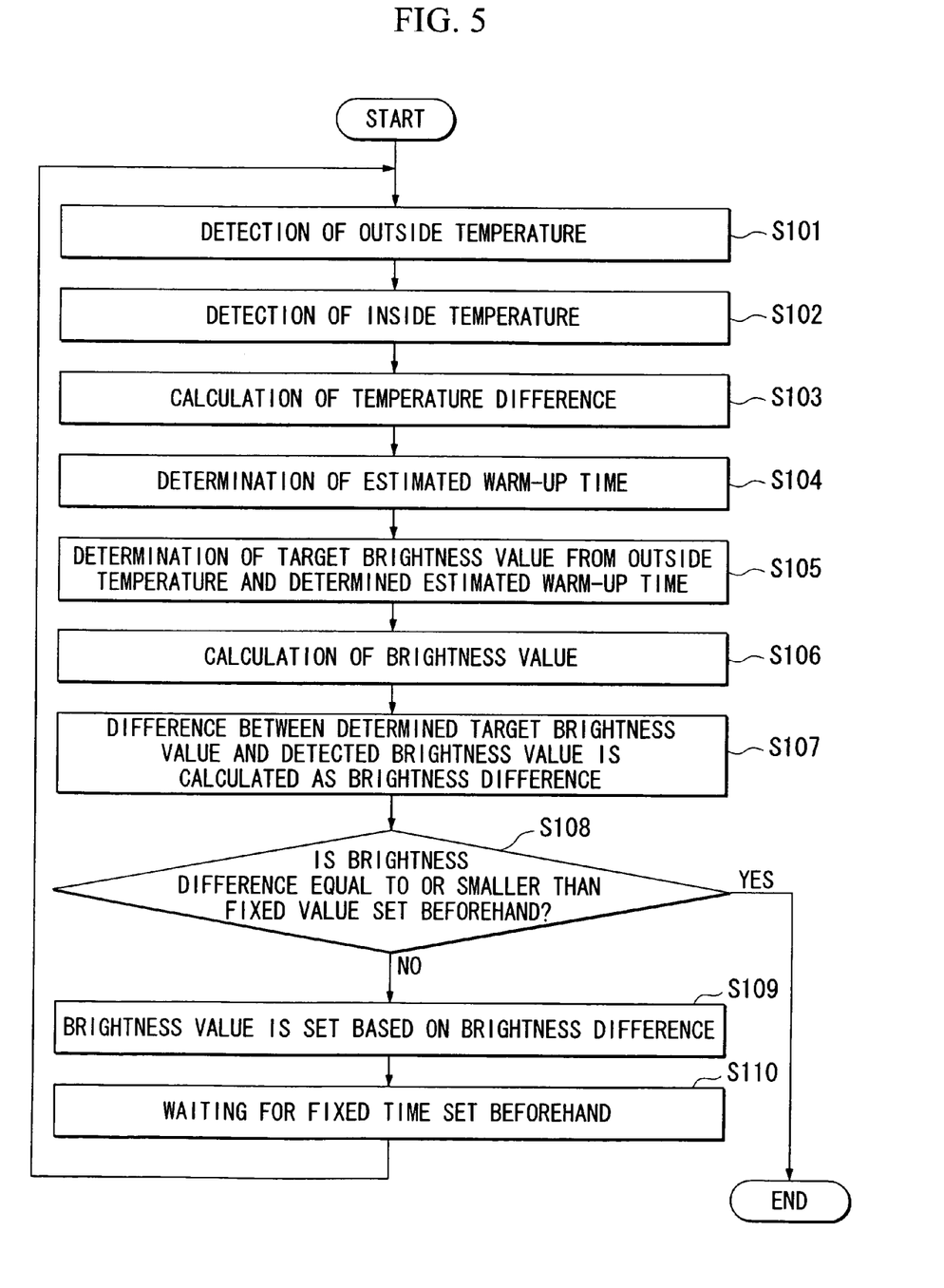
FIG. 5 is a flowchart illustrating an operation of the brightness adjusting device shown in FIG. 4.

Next, an operation of the brightness adjusting device 1 will be described using FIG. 5. Moreover, here, a case where the target brightness value characteristic function is stored for every outside temperature in the target brightness value characteristic function storing section 102 will be described.

In addition, it is assumed that a user who uses the brightness adjusting device 1 selects a product of the display device for the brightness adjusting device 1 beforehand by using an input device connected to the brightness adjusting device 1. Accordingly, the brightness adjusting device 1 selects the product inside temperature characteristic function from the product inside temperature characteristic function storing section 101 and selects the target brightness value characteristic function from the target brightness value characteristic function storing section 102 based on information on the product of the display device selected by the user.

First, the outside temperature detecting section 103 detects the outside temperature of the display device 2 with the outside temperature sensor 3 existing outside the display device 2 (step S101).

Then, the inside temperature detecting section 104 detects the inside temperature of the display device 2 with the inside temperature sensor 4 existing inside the display device 2 (step S102).

Then, the warm-up time determining section 106 calculates a temperature difference between the outside temperature detected by the outside temperature detecting section 103 and the inside temperature detected by the inside temperature detecting section 104 (step S103), reads a warm-up time corresponding to the calculated temperature difference from the product inside temperature characteristic function stored in the product inside temperature characteristic function storing section 101, and determines it as an estimated warm-up time (step S104).

Then, the target brightness value determining section 107 selects a target brightness value characteristic function corresponding to the outside temperature, which was detected by the outside temperature detecting section 103, from the target brightness value characteristic function storing section 102 and reads and determines a target brightness value corresponding to the estimated warm-up time, which was determined by the warm-up time determining section 106, from the selected target brightness value characteristic function (step S105).

Then, the brightness value detecting section 105 detects a brightness value of the display device 2 with the brightness sensor 5 (step S106). Then, the brightness value setting section 108 calculates, as a brightness difference, a difference between the brightness value of the display device 2 detected by the brightness value detecting section 105 and the target brightness value determined by the target brightness value determining section 107 (step S107).

Then, the brightness value setting section 108 detects whether or not the calculated brightness difference is equal to or smaller than a fixed value set beforehand (step S108).

When the calculated brightness difference is not equal to or smaller than the fixed value set beforehand in the detection result of step S108, the brightness value setting section 108 adjusts the brightness value of the display device 2 by setting the brightness value of the brightness value setting storing section 6 based on the brightness difference (step S109).

Then, the brightness value setting section 108 waits for the fixed time set beforehand and then repeats the processing from step S101 to adjust the brightness value of the display device 2.

On the other hand, when the calculated brightness difference is equal to or smaller than the fixed value set beforehand in the detection result of step S108, the brightness value setting section 108 ends the processing of adjustment of the brightness value of the display device 2, for example, by displaying on the check display device 8 a message indicating that the brightness adjustment of the display device 2 was ended (step S110).

By the above operation of the brightness adjusting device 1, the brightness adjusting device 1 can adjust the brightness value of the display device 2 without depending on the outside temperature or the warm-up time of the display device 2.

In addition, since the brightness adjusting device 1 estimates the warm-up time and performs the brightness adjustment according to the target brightness value at the estimated warm-up time, an effect that the brightness adjustment becomes possible in a short time even if there is no waiting for the warm-up time unlike the related art is obtained.

Second Embodiment

Although the inside temperature sensor and the outside temperature sensor were used in the first embodiment, a case where two inside temperature sensors are used will be described as a second embodiment. Only a different point from the first embodiment will be described below as the second embodiment.

Here, an explanation will be made assuming that one of two inside temperature sensors is a first inside temperature sensor and the other one is a second inside temperature sensor.

The first inside temperature sensor and the second inside temperature sensor are provided not at the same places but at the different places within the display device 2, for example, near upper and lower ends within the display device with a distance therebetween. This is to detect the temperature difference within the display device using the first inside temperature sensor and the second inside temperature sensor.

First, although the estimated warm-up time was calculated from the difference between the inside temperature and the outside air temperature of the display device using the outside temperature sensor and the inside temperature sensor in the first embodiment, the second embodiment is different in that the estimated warm-up time is calculated from the temperature difference within the display device using the first inside temperature sensor and the second inside temperature sensor which are provided near the upper and lower ends within the display device.

In addition, although the product inside temperature characteristic function stored in the product inside temperature characteristic function storing section 101 is stored for the temperature difference measured by the outside temperature sensor and the inside temperature sensor in the first embodiment, the second embodiment is different in that the product inside temperature characteristic function stored in the product inside temperature characteristic function storing section 101 is stored for the temperature difference measured by the first inside temperature sensor and the second inside temperature sensor.

When the display device 2 has two inside temperature sensors like the second embodiment, an effect that the brightness adjusting device 1 can adjust the brightness of the display device 2 without using the outside temperature sensor 3 is obtained.

Moreover, in explanations of the above embodiments, the explanations were made assuming that the product inside temperature characteristic function was stored beforehand as a product inside temperature table in the product inside temperature characteristic function storing section 101. However, it is not limited thereto, but the product inside temperature characteristic function storing section 101 may store a product inside temperature characteristic function as a function and calculate an estimated warm-up time for the temperature difference by the function.

The explanation was made assuming that the target brightness value characteristic function was stored beforehand as a target brightness value table in the target brightness value characteristic function storing section 102. However, it is not limited thereto, but the target brightness value characteristic function storing section 102 may generate a target brightness value characteristic function based on the outside temperature and generate a target brightness value table for the outside temperature based on the generated target brightness value characteristic function. Alternatively, the target brightness value characteristic function storing section 102 may calculate a target brightness value based on the outside temperature and the estimated warm-up time and based on the function which is a target brightness value characteristic function.

The product inside temperature characteristic function storing section 101, the target brightness value characteristic function storing section 102, and the brightness value setting storing section 6 may be formed by nonvolatile memories such as a hard disk device or a magneto-optic disk device and a flash memory, storage media in which only reading is possible, such as a CR-ROM, volatile memories such as a RAM (Random Access Memory), or combination thereof.

The brightness adjusting device 1 may be realized by hardware for exclusive use. In addition, the brightness adjusting device 1 may be formed by a memory and a CPU (central processing unit) and may realize the function by loading a program for realizing the function of the brightness adjusting device 1 to the memory and executing it.

The brightness adjustment may be performed by recording a program for realizing the function of the brightness adjusting device 1 in FIG. 1 in a computer-readable recording medium, reading the program recorded in the recording medium into a computer system, and executing it. In addition, the 'computer system' referred herein is assumed to include an OS or hardware, such as peripheral devices.

Although the liquid crystal display device was described as the display device 2 to which the present invention was applied, the display device is not limited thereto and the present invention may be applied to display devices whose brightness changes with the warm-up time, such as a CRT type display device, a plasma type display device, and display devices based on other arbitrary types.

While the embodiments of the invention have been described in detail with reference to the drawings, the specific configuration is not limited to the embodiments but a design and the like within the scope without departing from the subject matter of the invention are also included.

INDUSTRIAL APPLICABILITY

The present invention is suitable for being used for a brightness adjusting device that adjusts the brightness of a display device.

The invention claimed is:

1. A brightness adjusting device of a display device, comprising:
   an outside temperature detecting unit which detects an outside temperature of the display device with an outside temperature sensor device existing outside the display device;
   an inside temperature detecting unit which detects an inside temperature of the display device with an inside temperature sensor device existing inside the display device;
   a product inside temperature table storing unit in which a temperature difference between the outside temperature and the inside temperature, and a warm-up time of the display device are associated with each other beforehand to be stored as a product inside temperature table;
   a target brightness value table storing unit in which the warm-up time and a target brightness value, which is a brightness value becoming a target of the display device at the warm-up time, are associated with each other beforehand to be stored as a target brightness value table;
   a warm-up time determining unit which calculates a temperature difference between the outside temperature detected by the outside temperature detecting unit and the inside temperature detected by the inside temperature detecting unit, and reads and determines a warm-up time corresponding to the calculated temperature difference, as an estimated warm-up time, from the product inside temperature table stored in the product inside temperature table storing unit;
   a target brightness value determining unit which reads and determines a target brightness value, which corresponds to the estimated warm-up time read and determined by the warm-up time estimating unit, from the target brightness value table stored in the target brightness value table storing unit; and
   a brightness value setting unit which sets a brightness value of the display device according to the target brightness value read and determined by the target brightness value calculating unit.

2. The brightness adjusting device according to claim 1, wherein the target brightness value table storing unit stores the target brightness value table for every outside temperature, and
   the target brightness value determining unit selects the target brightness value table, which corresponds to the outside temperature detected by the outside temperature detecting unit, from the target brightness value table storing unit, and reads and determines the estimated warm-up time from the selected target brightness value table.

3. The brightness adjusting device according to claim 1, further comprising:
   a brightness value detecting unit which detects a brightness value of the display device with a brightness sensor device, and sets the brightness value of the display device based on the detected brightness value and the target brightness value determined by the target brightness value determining unit.

4. A brightness adjusting device of a display device, comprising:
   a first inside temperature detecting unit which detects a first inside temperature, which is a temperature of a first portion of the display device, with a first inside temperature sensor device existing at the first portion of the display device;
   a second inside temperature detecting unit which detects a second inside temperature, which is a temperature of a second portion of the display device, with a second inside temperature sensor device existing at the second portion of the display device;

a product inside temperature table storing unit in which a temperature difference between the first inside temperature and the second inside temperature, and a warm-up time of the display device are associated with each other beforehand to be stored as a product inside temperature table;

a target brightness value table storing unit in which the warm-up time and a target brightness value, which is a brightness value becoming a target of the display device at the warm-up time, are associated with each other beforehand to be stored as a target brightness value table;

a warm-up time determining unit which calculates a temperature difference between the first inside temperature detected by the first inside temperature detecting unit and the second inside temperature detected by the second inside temperature detecting unit, and reads and determines a warm-up time corresponding to the calculated temperature difference, as an estimated warm-up time, from the product inside temperature table stored in the product inside temperature table storing unit;

a target brightness value determining unit which reads and determines a target brightness value, which corresponds to the estimated warm-up time read and determined by the warm-up time determining unit, from the target brightness value table stored in the target brightness value table storing unit; and a brightness value setting unit which sets a brightness value of the display device according to the target brightness value read and determined by the target brightness value determining unit.

5. A brightness adjusting method used in a display device, including:

a product inside temperature table storing step in which a temperature difference between an outside temperature of the display device and the inside temperature, and a warm-up time of the display device are associated with each other beforehand to be stored as a product inside temperature table in a product inside temperature table storing unit;

a target brightness value table storing step in which the warm-up time, and a target brightness value, which is a brightness value becoming a target of the display device at the warm-up time, are associated with each other beforehand to be stored as a target brightness value table in a target brightness value table storing unit;

an outside temperature detecting step in which an outside temperature sensor device existing outside the display device detects the outside temperature of the display device;

an inside temperature detecting step in which an inside temperature sensor device existing inside the display device detects the inside temperature of the display device;

a warm-up time determining step in which a warm-up time determining unit calculates a temperature difference between the outside temperature detected by the outside temperature detecting unit and the inside temperature detected by the inside temperature detecting unit, and reads and determines a warm-up time corresponding to the calculated temperature difference, as an estimated warm-up time, from the product inside temperature table;

a target brightness value determining step in which a target brightness value determining unit reads and determines a target brightness value, which corresponds to the estimated warm-up time read and determined, from the target brightness value table; and a brightness value setting step in which a brightness value setting unit sets a brightness value of the display device according to the target brightness value read and determined.

6. The brightness adjusting device according to claim 2, further comprising:

a brightness value detecting unit which detects a brightness value of the display device with a brightness sensor device, and sets the brightness value of the display device based on the detected brightness value and the target brightness value determined by the target brightness value determining unit.

* * * * *